(12) United States Patent
Niedziela et al.

(10) Patent No.: US 7,753,425 B2
(45) Date of Patent: Jul. 13, 2010

(54) LOAD CARRIER ARRANGEMENT FOR A VEHICLE BED COMPRISING AN INTERNAL BED RAIL SYSTEM

(75) Inventors: Ted Niedziela, Southbury, CT (US); William Fortune, Branford, CT (US); Kevin Harris, Middlebury, CT (US)

(73) Assignee: Thule Sweden AB, Hillerstorp (SE)

( * ) Notice: Subject to any disclaimer, the term of this patent is extended or adjusted under 35 U.S.C. 154(b) by 263 days.

(21) Appl. No.: 11/934,626

(22) Filed: Nov. 2, 2007

(65) Prior Publication Data

US 2008/0054037 A1 Mar. 6, 2008

Related U.S. Application Data

(63) Continuation of application No. 11/461,738, filed on Aug. 1, 2006, now Pat. No. 7,296,837.

(60) Provisional application No. 60/596,932, filed on Oct. 31, 2005.

(51) Int. Cl.
*B60R 9/00* (2006.01)
(52) U.S. Cl. .............. 296/3; 224/405; 248/229.14
(58) Field of Classification Search .......... 224/400, 224/402, 403, 405, 558; 248/228.5, 229.12, 248/229.14, 231.41, 231.61, 316.6; 296/3, 296/39.2
See application file for complete search history.

(56) References Cited

U.S. PATENT DOCUMENTS

| | | | | |
|---|---|---|---|---|
| 2,570,802 A | * | 10/1951 | Hatteburg | 224/405 |
| 2,649,142 A | * | 8/1953 | New | 297/395 |
| 4,796,942 A | * | 1/1989 | Robinson et al. | 296/39.2 |
| 5,052,737 A | * | 10/1991 | Farmer, Jr. | 296/39.2 |
| 5,228,739 A | * | 7/1993 | Love | 296/100.02 |
| 5,393,114 A | * | 2/1995 | Christensen | 296/36 |
| 5,655,808 A | * | 8/1997 | Wheatley | 296/100.17 |
| 5,765,902 A | * | 6/1998 | Love | 296/100.01 |
| 5,927,788 A | * | 7/1999 | Long | 296/39.2 |
| 5,975,618 A | * | 11/1999 | Rippberger | 296/100.18 |
| 6,024,402 A | * | 2/2000 | Wheatley | 296/100.18 |
| 6,059,159 A | * | 5/2000 | Fisher | 224/403 |
| 6,116,673 A | * | 9/2000 | Clonan | 296/37.6 |

(Continued)

FOREIGN PATENT DOCUMENTS

FR 2617776 A1 * 1/1989

*Primary Examiner*—Glenn Dayoan
*Assistant Examiner*—Paul A Chenevert
(74) *Attorney, Agent, or Firm*—Novak Druce + Quigg LLP

(57) ABSTRACT

Load carrier mountable above a bed structure of a vehicle having an upper surface and an internal bed rail system is disclosed. The load carrier broadly includes an upright base support member, an internal rail clamping assembly, and a clamp adjustment assembly. The upright base support member rests upon the upper surface of the side wall of the bed structure and connects with the internal rail clamping assembly. The upright base support member has a first clamp surface for asserting a clamping force upon the upper surface of the side wall of the bed structure. The rail clamping assembly is releasably securable to the internal bed rail system and includes a second clamp surface for asserting a clamping force upon the internal bed rail system. The clamp adjustment assembly positionally adjusts the first clamping surface with respect to the second clamping surface between clamped and unclamped positions.

28 Claims, 10 Drawing Sheets

U.S. PATENT DOCUMENTS

| | | | |
|---|---|---|---|
| 6,913,175 B2 * | 7/2005 | Martin | 224/403 |
| 7,296,836 B1 * | 11/2007 | Sabo | 296/3 |
| 2004/0262348 A1 * | 12/2004 | Green | 224/405 |
| 2005/0023314 A1 * | 2/2005 | Williams et al. | 224/405 |
| 2008/0100075 A1 * | 5/2008 | Derecktor | 296/3 |
| 2008/0230665 A1 * | 9/2008 | Palermo | 248/231.71 |

* cited by examiner

LOAD CARRIER ARRANGEMENT FOR A VEHICLE BED COMPRISING AN INTERNAL BED RAIL SYSTEM

RELATED APPLICATIONS

This application is a continuation of U.S. patent application Ser. No. 11/461,738 filed Aug. 1, 2006 now U.S. Pat. No. 7,296,837, titled LOAD CARRIER ARRANGEMENT FOR A VEHICLE BED COMPRISING AN INTERNAL BED RAIL SYSTEM, which claims priority to U.S. provisional application 60/596,932 filed Oct. 31, 2005. Said applications are expressly incorporated herein by reference in their entirety.

FIELD OF THE INVENTION

The present invention relates generally to load carriers for vehicles having bed structures, and more specifically, to vehicles having bed structures comprising internal bed rail systems.

BACKGROUND OF THE INVENTION

Load carriers, and particularly sports equipment carriers, for vehicles having bed structures are known devices for transporting cargo above the bed structure of a vehicle. Common uses of such load carriers can include the transport of generally elongate objects, such as ladders, piping, lumber, construction materials, etc. Likewise, sport related uses of such load carriers can include the transport of canoes, kayaks, paddles and similar equipment. An example of a particularly commercially successful load carrier for a vehicle having a bed structure is Thule's XSPORTER carrier.

As illustrated in FIGS. 1-3 of the present application, the XSPORTER carrier broadly includes a plurality of upright base support members each configured for securing a generally vertically adjustable upright member. A pair of upright members is shown as securing a load bearing crossbar member therebetween such that cargo can be set and secured thereon. Each upright base support member includes a generally flat, planar lower surface configured for resting and being clampably secured to the top rail of a truck bed side wall. Heretofore, top rails of pickup truck beds were primarily formed from a single ply of relatively rigid sheet metal bent upon itself to form a generally inverted J-shaped structure forming a hollow. To clampably secure a base support member to the top rail, a clamping assembly was used in conjunction with the base support member to apply a clamping force upon the upper and lower surfaces of the top rail.

While the above-described XSPORTER carrier and associated clamping assemblies remain popular and successful, they are, however, occasionally incapable of securing load carriers upon some types of new vehicles; i.e., pickup trucks having new types of top rail structure and/or internal bed rail systems; examples include the 2006 TOYOTA TACOMA, 2006 HONDA RIDGELINE, AND 2006 NISSAN TITAN AND FRONTIER pickup trucks. In these examples the new top rail structures are not generally J-shaped and/or do not generally allow ready access to the upper and lower surfaces of the top rail. Similarly, current load carriers and clamping assemblies therefor are not configured for being secured to the rails of the internal bed rail systems of these newer vehicles.

It should be appreciated that a primary reason that the vehicle manufacturers have changed to these alternative configurations are predominantly cost driven. To reach this goal, more of the truck bed components, including those relied upon for securing load carriers of the type presently addressed, are made from plastic, composites and similar materials that are significantly more flexible than the traditional sheet metal used in pickup bed construction. This loss in structural rigidity further contributes to the difficulties experienced in mounting load carriers of the present type upon pickup trucks where these carriers have traditionally relied heavily upon the fortitude of the top rail of the truck bed.

An effect of the truck manufacturers using installed rail systems for receiving such things as load carrier mountings in the pickup truck beds is that the rail configurations on different makes and models of trucks now vary widely. This presents a problem for load carrier manufacturers in that the use of universal mounting hardware is no longer possible and a wide variety of differently configured mounting hardware must be provided in order to accommodate owners of different vehicles. This means that this cost-saving move of the truck manufacturers has resulted in a cost increase to the load carrier manufacturers. Therefore, a goal of the present invention is to minimize this detrimental impact on load carrier manufacturers while at the same time providing a superior truck bed style load carrier to consumers.

SUMMARY OF THE INVENTION

The present invention satisfies the goals outlined above for the load carrier manufacturers, as well as the consumers that use such vehicle carriers. In a first instance, the invention utilizes mounting hardware comprising three primary components. In this manner, the invention enables the use of substantially universal top and bottom mount assembly pieces, with a intermediate third piece or component that acts as an adapter and which customizes the mounting assembly for a particular vehicle's configuration. The primary benefit of this strategy is that only one part of the mount needs to be supplied in different configurations for accommodating the different truck bed designs. Therefore, the present invention in at least one embodiment takes the form of a mounting arrangement for a truck bed load carrier in which an array of these intermediate pieces may be supplied with a complement of standard top and bottom pieces in order to provide a full array of mounts for a number of differently configured pickup trucks. Not only is this cost savings strategy beneficial to the load carrier manufacturers, but also to their distributors and retailers who can now maintain smaller product inventory while accommodating the same number of vehicle designs.

The present invention also derives a benefit from the more flexible construction of the top of the truck's bed wall (top rail), as well in the newly-employed rail assemblies. When the mounting assemblies of the present invention are tightened into a transporting configuration, a substantially rigid component is established. This rigid component which spans between the top rail and rail assembly provides a solid mounting for the carrier components supported thereupon. Because the mounting assembly is anchored at both top and bottom locations, twist with respect to the vehicle is substantially prevented. Moreover, the flexibility of the truck components causes them to bias outwardly against the tightened mounting hardware in the transporting configuration thereby beneficially acting as a takeout mechanism for looseness that may result in the interconnection between the carrier's mounting hardware and the vehicle during use.

In at least one exemplary embodiment, the present invention provides a load carrier that is mountable above a bed structure of a vehicle having an upper surface and an internal bed rail system. The load carrier broadly includes an upright base support member, an internal rail clamping assembly, and a clamp adjustment assembly. The upright base support member is connected to the rail clamping assembly and forms a first clamp surface for asserting a clamping force upon the upper surface of the vehicle side wall, or top rail. The rail clamping assembly is releasably securable to a rail of the internal bed rail system and forms a second clamp surface configured to assert a clamping force upon the rail. The rail clamping assembly is also configured for sliding movement with respect to the upright base support member as well as the rail of the internal bed rail system such that the load carrier's position relative to a long axis of the carrying vehicle may be readily adjusted. The clamp adjustment assembly is configured for positionally adjusting the first clamping surface with respect to the second clamping surface between clamped and unclamped positions.

In a preferred embodiment, the first and second clamping surfaces apply inwardly directed clamping forces upon the upper surface of the top rail and the upper surface of the rail of the internal bed rail system, respectively. In some embodiments of the invention the rail clamping assembly releasably connects to the upright base support member. In some embodiments of the invention the upright base support member and the rail clamping assembly comprise a releasable interlocking joint comprising a tenon and mortise wherein the tenon is fan-shaped. In some embodiments of the invention comprising an interlocking joint, the clamp adjustment assembly is adjustable such that when the clamping force(s) is asserted, a pulling force is applied upon a member of the releasable interlocking joint.

In some embodiments, the clamp adjustment assembly comprises a threaded fastener and threaded bore for adjusting between clamped and unclamped positions, but could be formed from other structures that allow the assembly to be adjusted between clamped and unclamped positions. For example, straps and buckle assemblies could be utilized. In some embodiments, the rail clamping assembly and the upright base support member are configured for movement relative to one another such that the rail clamping member can be adjusted along a length of the upright base support member. In some embodiments of the invention, a resilient structure is disposed between the upper surface of the top rail and first clamp surface. In some embodiments, the resilient structure is formed from plastic, rubber, combinations thereof, or other resilient materials that may assist in preventing damage to the vehicle. In some embodiments, the resilient structure is a component of the vehicle; e.g., a portion of a bed liner and/or can be a component of the upright base support member; e.g., a rubber or plastic boot.

In some embodiments of the invention, the rail clamping assembly includes a foot member configured for substantial complementary fit with a portion of a rail of the internal bed rail system. In some embodiments of the invention, a rail of the internal bed rail system has a generally C-shaped cross-section, a generally I-shaped cross-section, a generally L-shaped cross-section, or other shape, which allows a second clamp surface to be secured to the rail. In embodiments wherein the rail assembly comprises a C-shaped cross section, the rail includes a pair of generally parallel wall structures and a base wall structure, the base wall structure being secured to an inner side wall of the bed structure such that the parallel walls project substantially orthogonal from the side walls of the bed structure. In some embodiments, the rail clamping assembly is releasably securable to one of the generally parallel side wall structures. In some embodiments of the invention, the rail clamping assembly is slidable along a length of a rail.

In some embodiments of the invention, the rail clamping assembly includes an upper rail clamping member and a lower rail clamping member, wherein the upper rail clamping member connects to the upright base support member and the lower rail clamping member connects to the upper rail clamping member. In some embodiments, the upper rail clamping member and the lower rail clamping member are configured for releasably clampably securing a portion of a rail therebetween. In some embodiments, the upper rail clamping member and the lower rail clamping member are configured for receiving a component of the clamp adjustment assembly which can comprise a threaded adjustment rod. In some embodiments of the invention, the upper rail clamping member and the lower rail clamping member include a rotational arresting assembly for preventing rotational movement between the two structures. In some embodiments the rotational arresting assembly comprises an abutment and a recess for receiving the abutment therein.

In some embodiments of the invention, the rail clamping assembly is releasably connected to the upright base support member by a fastener and in other embodiments the rail clamping assembly is integrally connected with the upright base support member.

In some embodiments of the invention, a rail of an internal bed rail system is secured to a side wall of the bed structure such that it is generally parallelly disposed with respect to the upper surface of the side wall. In some embodiments of the invention, the upright base support member is releasably connected to the rail clamping assembly by an interlocking joint, and the upright base support member comprises a first clamp surface for asserting an inwardly directed clamping force upon the upper surface of the top rail. In some embodiments, the rail clamping assembly is releasably secured to the rail and forms a second clamp surface which asserts an inwardly directed clamping force upon the rail and the clamp adjustment assembly adjusts the first clamp surface with respect to the second clamp surface between clamped and unclamped positions.

BRIEF DESCRIPTION OF THE DRAWINGS

The invention will now be more fully described by way of example with reference to the accompanying drawings in which.

DETAILED DESCRIPTION OF THE INVENTION

The present invention will now be described and disclosed in greater detail. It is to be understood, however, that the disclosed embodiments are merely exemplary of the invention and that the invention may be embodied in various and alternative forms. Therefore, specific structural and/or functional details disclosed herein are not to be interpreted as limiting the scope of the claims, but are merely provided as an example to teach one having ordinary skill in the art to make and use the invention.

Figure 1:
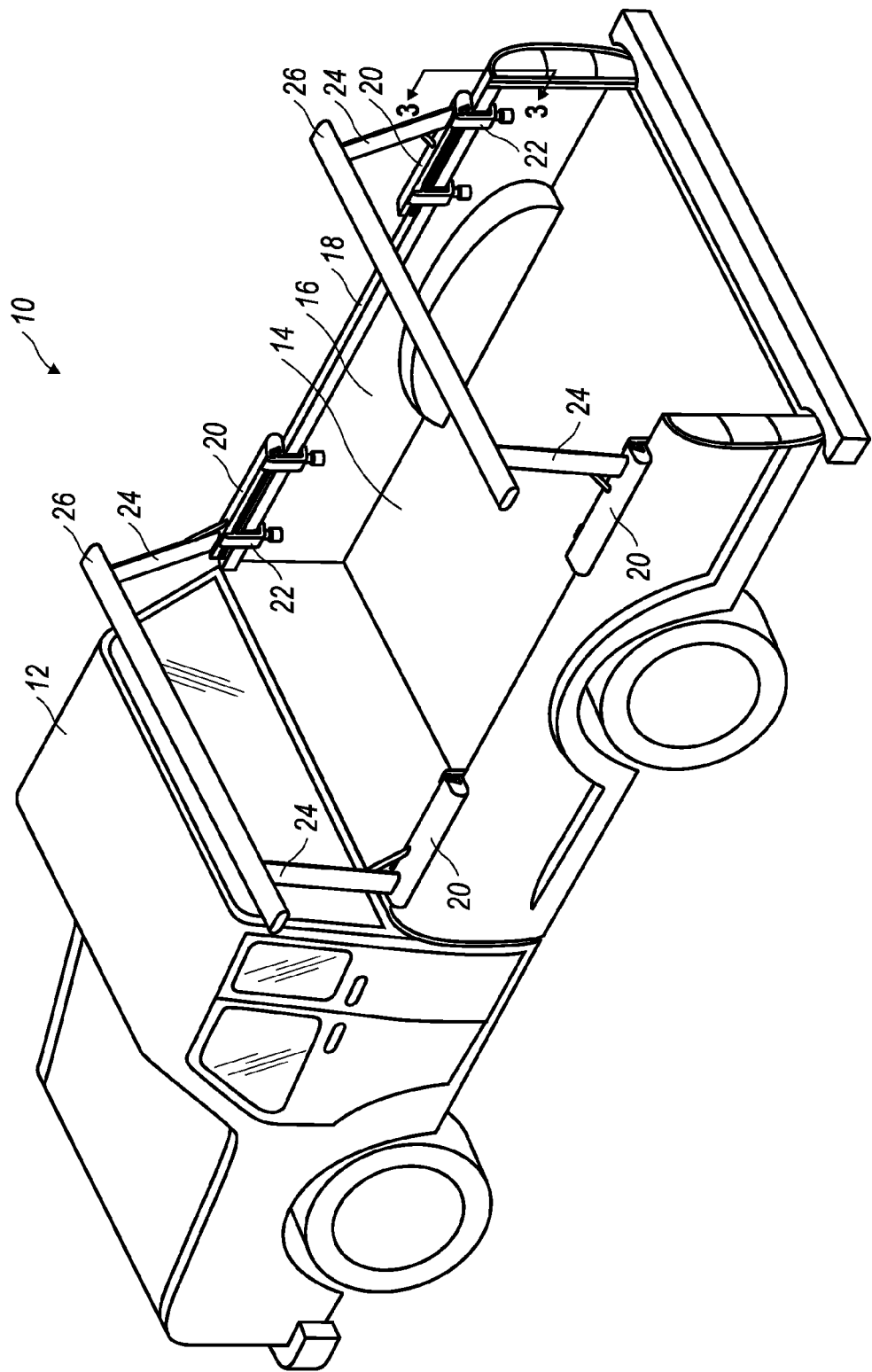
FIG. 1 is a perspective view of a known type of load carrier system secured to a generally inverted J-shaped vehicle bed top rail.
Figure 2:
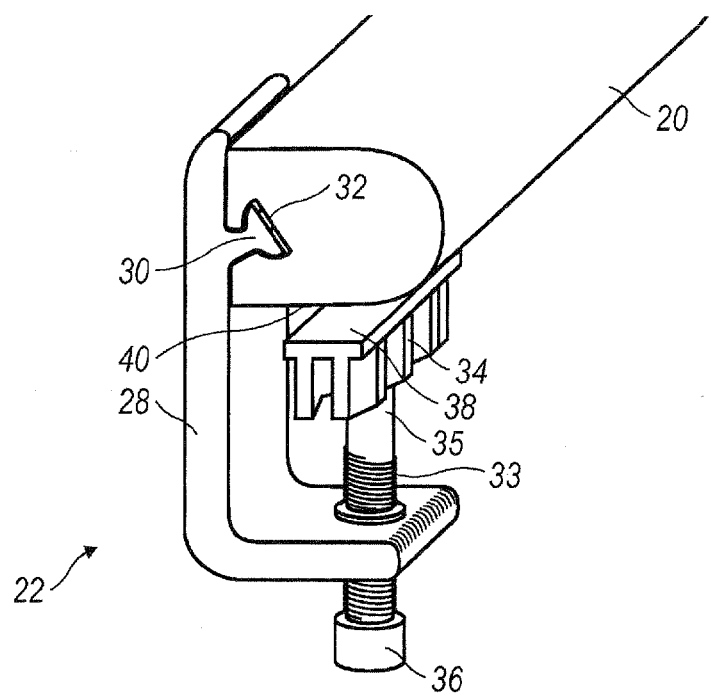
FIG. 2 is a detailed perspective view of a known clamping assembly for securing a load carrier to a J-shaped vehicle bed top rail.
Figure 3:
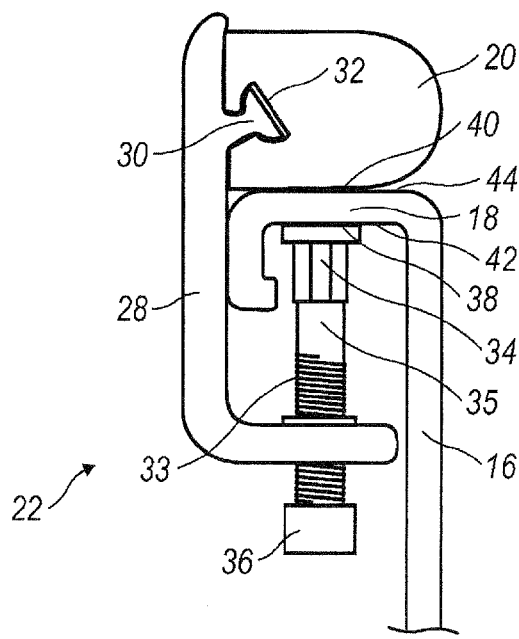
FIG. 3 is a partial cutaway view, taken generally along line 3-3 of FIG. 1, which illustrates the mounting of a load carrier to a vehicle bed top rail using the know clamping assembly of FIGS. 1 and 2.
Figure 4:
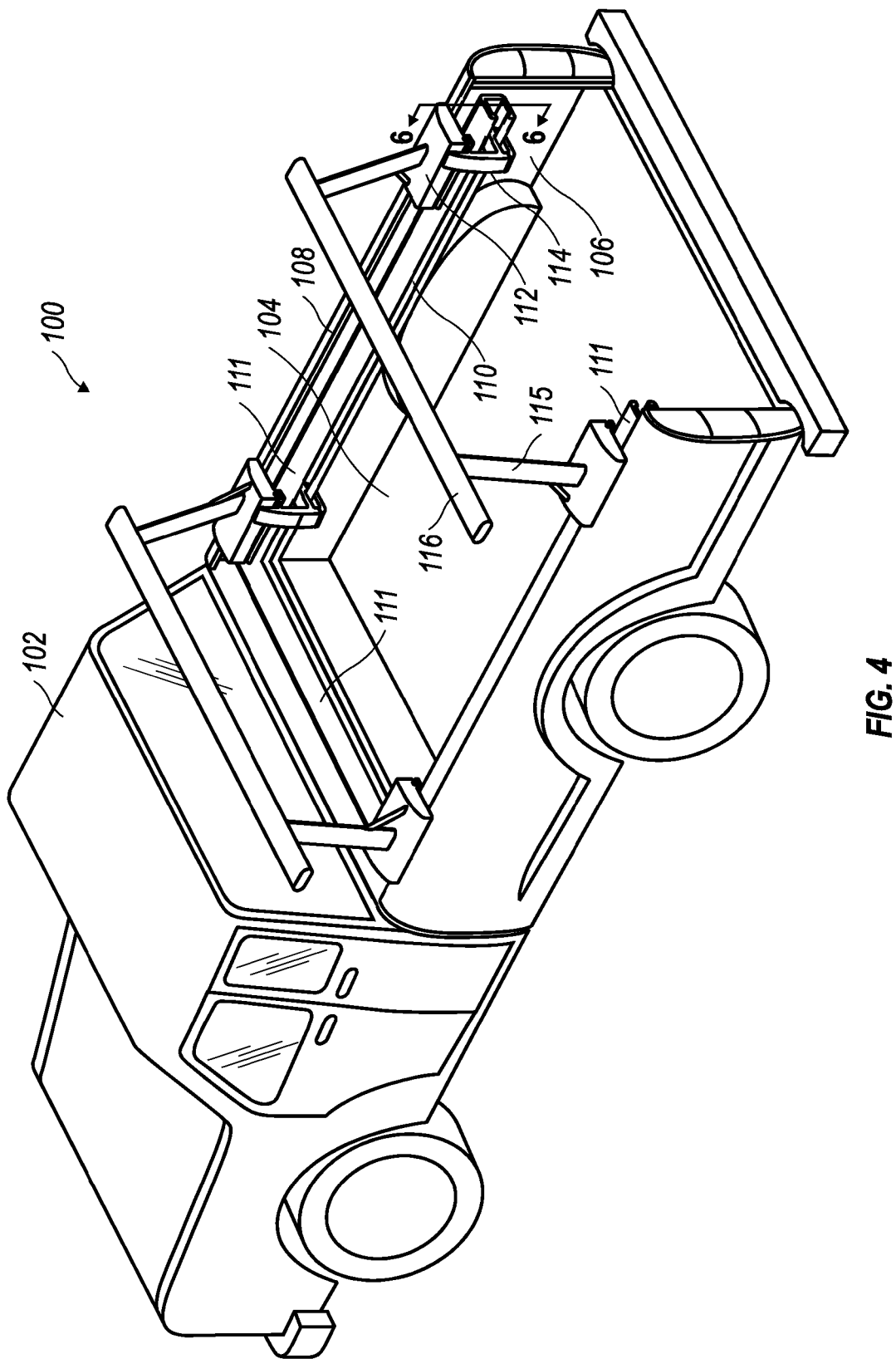
FIG. 4 is a perspective view illustrating a load carrier configured according to the present invention and secured to a vehicle (pickup truck) having a bed top rail and internal bed rail system.
Figure 5:
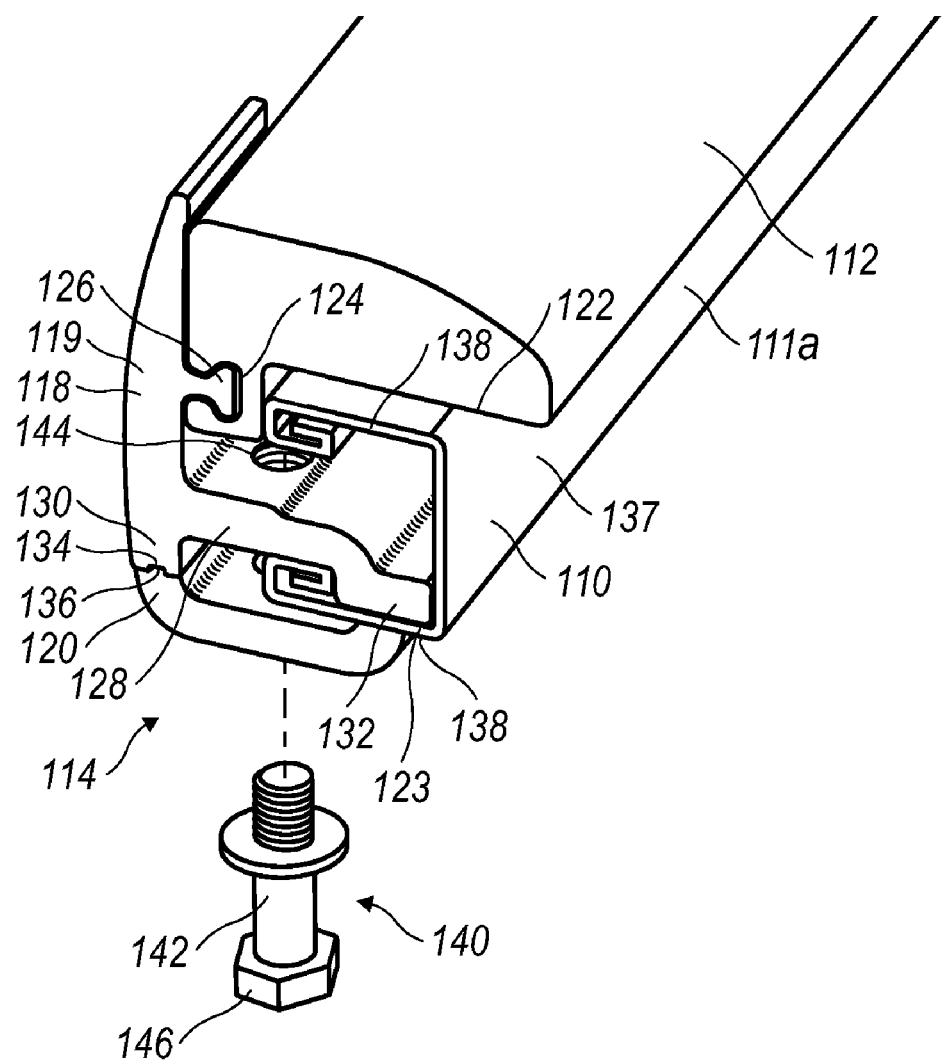
FIG. 5 is a perspective view of a clamping assembly configured according to the present invention for securing a load carrier to a vehicle having a top rail upper surface and an internal bed rail system.

At the outset, a description of the structure of a known vehicle bed structure and load carrier therefor is provided for further illustrating the present invention. Referring to FIGS. 1-3, a load carrier 10 of known design is illustrated as being fixed to vehicle 12 having a bed structure 14. In the illustrated embodiment, vehicle 12 is a common pickup-type truck wherein bed structure 14 broadly comprises side walls 16 and top rails 18 having upper surfaces 44 (see FIG. 3). Top rails 18 are generally formed from a single ply of rigid sheet metal that is bent to form a generally inverted J-shaped structure.

Known load carrier 10 is illustrated as broadly comprising upright base supports 20, clamping assemblies 22, upright members 24 and cross members 26. As illustrated more clearly in FIGS. 2 and 3, each of clamping assemblies 22 includes upright base support 20, L-shaped clamp member 28 and clamp adjustment assembly 33. Upright base support 20 includes lower surface 40, which is configured for resting upon upper surface 44 of top rail 18, and connects with L-shaped clamp member 28 by means of tenon 30 and mortise 32. Clamp adjustment assembly 33 is threadably received by L-shaped clamp member 28, and includes clamp foot 34, threaded rod 35 and adjustment member 36. As illustrated more clearly in FIG. 3, clamp foot 34 includes foot clamping surface 38 for abutting lower surface 42 of top rail 18. Consequently, when known load carrier 10 is secured upon a vehicle 12, the lower surface 40 of upright base support member 20 asserts a clamping force upon the upper surface 44 of top rail 18 and clamping foot 34 asserts a clamping force upon the lower surface 42 of top rail 18.

Referring now to FIGS. 4-8B, load carrier 100 according to the present invention is illustrated as being detachably secured to vehicle 102 having bed structure 104. Bed structure 104 can include side walls 106, top rails 108 and an internal rail system 110, for example, of a type currently commercially available in the 2006 TOYOTA TACOMA, 2006 HONDA RIDGELINE, AND 2006 NISSAN TITAN AND FRONTIER pickup-type trucks. Internal rail system 110 generally includes one or more rails 111 (see also FIGS. 7A-7B) disposed about the side walls 106 of the bed structure of the vehicle. In the embodiment illustrated, rails 111 are shown as being generally parallelly disposed with respect to the lower bed surface of the bed structure and are secured upon a plurality of the side walls of the bed structure. Top rails 108 can include upper surface 109 and lower surface 113, which surfaces are separated by gap 117; consequently, it can be difficult to secure known clamping assemblies, for instance those of the type previously described (clamping assembly 22) and shown in FIGS. 1-3. Bed structure 104 can include bed liner 148, of which portions thereof can extend over top rails 108.

In a preferred embodiment, load carrier 100 is assembled from a plurality of components that include, but are not limited to: upright base support member 112, rail clamping assembly 114, clamp adjustment assembly 140, upright member 115, and cross member 116. Generally, upright base support member 112 forms a first clamp surface 122 and rail clamping assembly 114 forms a second clamp surface 123, which apply inwardly directed clamping forces upon the top rail of the vehicle bed structure and a portion of a rail of an internal rail system 110, respectively.

Upright base support members 112 are generally provided for supporting the load carrier upon the vehicle and also serving as base members for the upright members 115 which extend vertically therefrom. Upright base support member 112 broadly comprises first clamp surface 122, which is a generally planar surface that is configured for being rested upon, or above, the upper surface 109 of top rail 108 of bed structure 104, and asserting an inwardly directed clamping force upon the top rail 108. Base support 112 further includes mortise 124 for releasably and slidably receiving rail clamping assembly 114 therein. In the embodiment illustrated, mortise 124 comprises a generally fan-shaped channel for receiving complementarily shaped tenon 126 of rail clamping assembly 114. In a preferred embodiment, mortise 124 extends along the longitudinal length of the upright base support member 112 such that the upright base support member 112 and the rail clamping assembly 114 may slide with respect to one another (when no clamping force is being asserted).

Resilient material 150 can be disposed between first clamp surface 122 of the upright base support member and top rail 108 of the vehicle to prevent damage to the vehicle and assist in securing the load carrier thereupon. Resilient material 150 can be a component of the upright base support member 112, or may comprise a portion of a bed liner 148 as shown schematically in FIGS. 6A-6C. Preferably, resilient material 150 is formed from plastic, rubber or other material.

Upright base support members 112 can be configured to fixedly secure upright members 115 thereto; e.g., as by means of welding, or can be configured to detachably secure the upright members thereto. Upright members 115 are configured for securing cross members 116, which may be fixedly attached thereto or detachably secured thereupon.

Rail clamping assemblies 114 are generally provided for detachably securing the upright support members 112 and applying an inwardly directed clamping force upon rail 111 of a vehicle's internal rail system 110 or similar structural members. In the embodiment illustrated, rail clamping assembly 114 comprises upper rail clamping member 118 and lower rail clamping member 120. Upper rail clamping member 118 is substantially L-shaped and includes upper portion 119 and lower portion 128. Upper portion 119 is generally configured for abutting a side wall of the upright base support member 112 and lower portion 128 is generally provided for releasably fastening lower rail clamping member 120 and a portion of rail 111.

Intermediate upper portion 119 has a tenon 126 that is configured for being detachably and slidably received by mortise 124 of upright base support member 112. In the embodiment illustrated, tenon 126 is fan-shaped (dovetailed) such that it may be slidably received by the fan-shaped mortise 124. It should be appreciated that other shapes of the tenon 126 and mortise 124 may be utilized.

Lower portion 128 has a generally inverted U-shape and comprises foot portion 132 and stud portion 130. Foot portion 132 is configured for being substantially complementarily received within recess 152 (see FIGS. 6B-6C) of rail 111 such that rotational movement between the foot and the rail can be prevented. Intermediate foot portion 132 and stud portion 130 is a threaded bore for receiving therein a threaded portion of adjustment rod 142. In the illustrated embodiment, stud portion 130 includes recess 134 for receiving the tongue, ridge or abutment 136 of lower rail clamping member 120 therein such that rotational movement between the upper rail clamping member and the lower rail clamping member 120 is prevented by the splined arrangement. In the embodiment illustrated, recess 134 comprises an elongated channel that extends along the length of the stud portion and abutment 136 comprises a wall that extends along the length of the lower rail clamping member 120, however, abutment 136 and recess 134 can comprise other structures; e.g. a pin member and bore.

Lower rail clamping member 120 is generally U-shaped and includes first leg 133, which is configured for being releasably secured to rail 111 and second leg 131, which is configured for mating engagement with stud portion 130 of upper rail clamping member 118. Intermediate the first and second leg 133, 131 is a bore 135 for receiving rod 142 of clamp adjustment assembly 140 therethrough.

Clamp adjustment assembly 140 is generally provided for securing rail clamping assembly 114 to a rail 111 of internal rail system 110 to thereby form a second clamp surface 123 as well as adjust the distance between the first clamp surface 122 and the second clamp surface such that an inwardly directed clamping force can be applied by the upright base support member 112 and the rail clamping assembly 114. Clamp adjustment assembly 140 generally comprises lower portion 128 of upper rail clamping assembly 118, lower rail clamping assembly 120, and adjustment rod 142. As illustrated in the FIGS. 6A-6C, adjustment rod 142 includes a threaded portion that is received by a threaded bore 144 of the upper rail clamping assembly 118, and head portion 146 that abuts the lower rail clamping assembly 120. Rotating adjustment rod 142 in a direction to cause tightening thus causes the upper rail clamping assembly and the lower rail clamping assembly to tighten upon one another such that rail 111 may be secured between foot 132 and first leg 133.

Figure 6A:
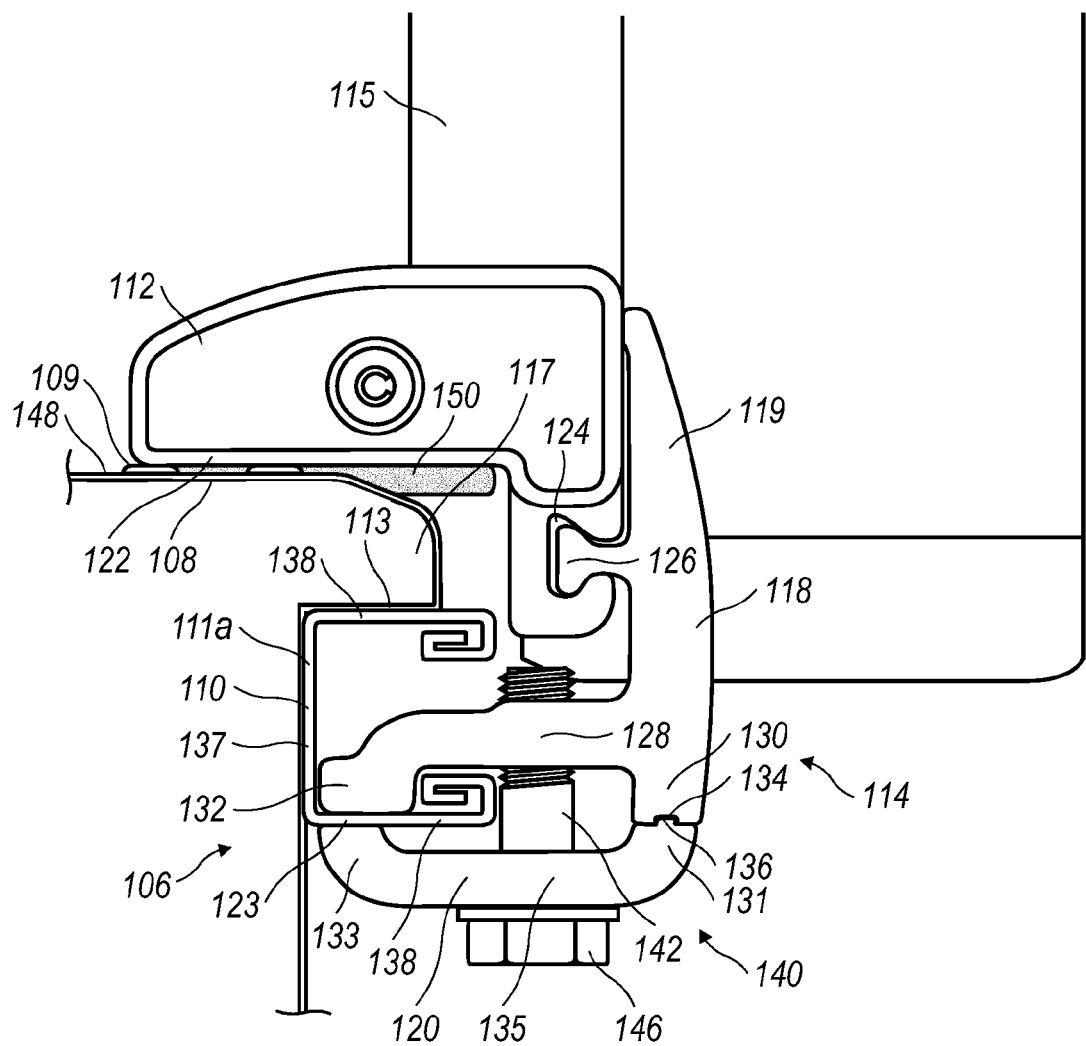
FIG. 6A is a partial cutaway view, taken generally along line 6-6 in FIG. 4, which illustrates a load carrier according to the present invention secured to a vehicle having a bed top rail and internal bed rail system.
Figure 6B:
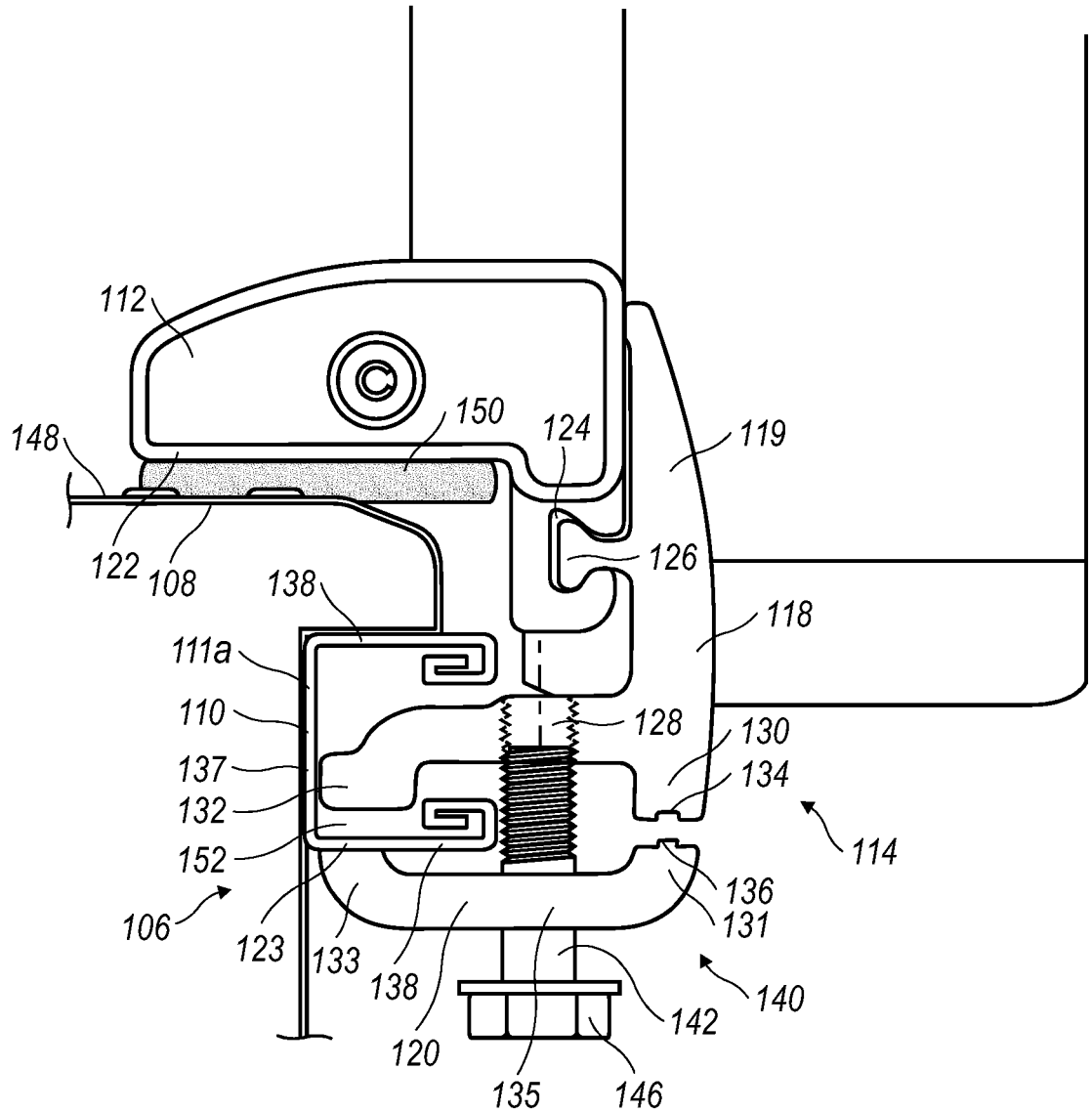
FIG. 6B is a partial cutaway view of the load carrier of FIG. 6A, but illustrating the clamp adjustment assembly as being partially loosened.
Figure 6C:
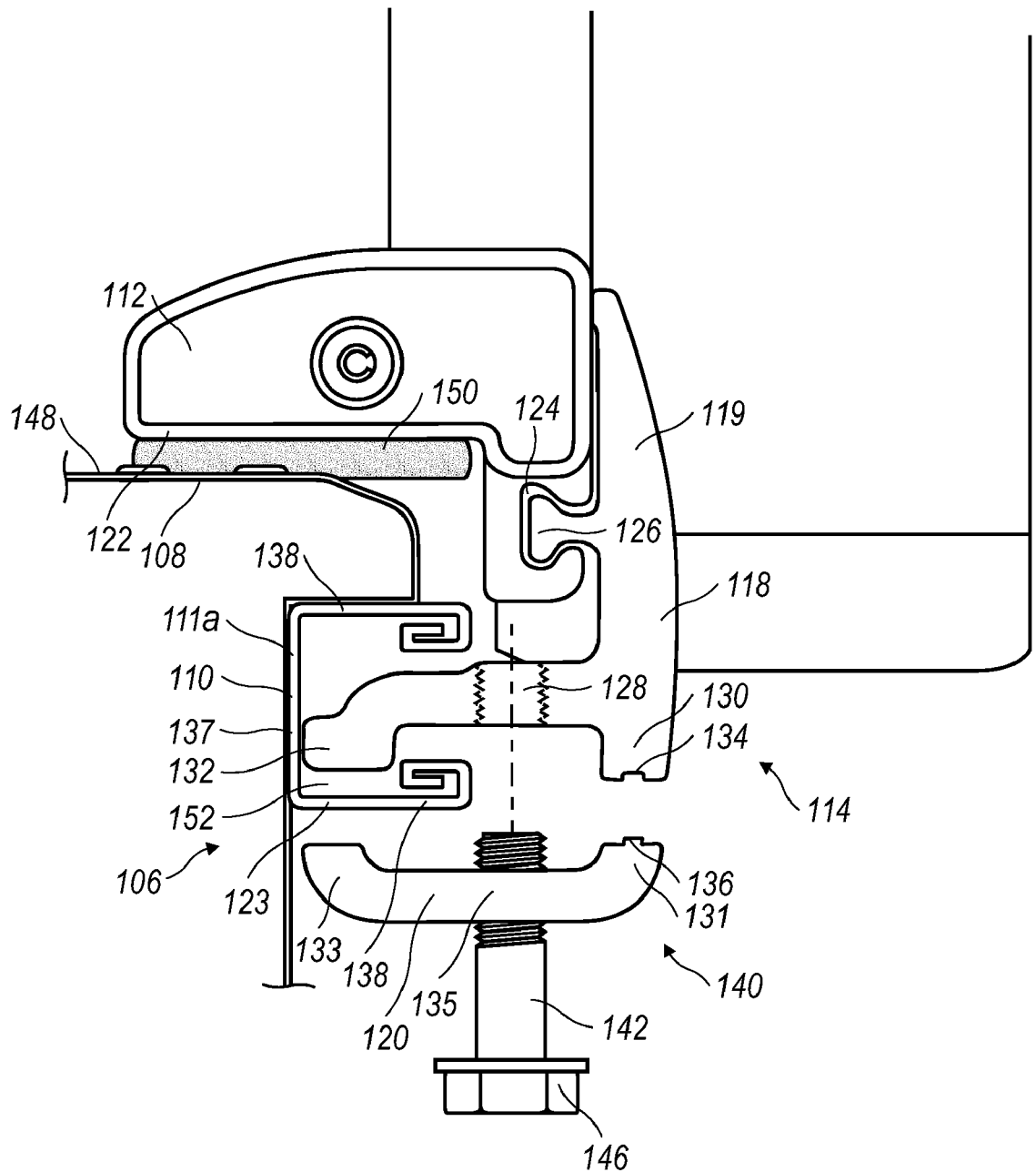
FIG. 6C is a partial cutaway view of the load carrier of FIG. 6A, but illustrating the clamp adjustment assembly as being fully loosened for disengagement.

As shown in FIGS. 6B-6C, the distance between the first clamp surface 122 of the upright base support member 112 and lower portion 128 of the upper rail clamping member 118 is generally fixed (except for the amount of freedom allowed by the tenon 126 and mortise joint 124), or is adjustably fixable, to form gap 152 between foot portion 132 and rail 111 when the clamping assembly 114 is in a resting state. Tightening rail clamp adjustment assembly 140 causes the upper rail clamping member 118 to be drawn in a downward direction toward the lower rail clamping member 120 until they abut one another. Prior to their abutment, however, the downward movement of the upper rail clamping assembly 118 causes tenon 126 to assert a generally downwardly directed force upon mortise 126, which causes upright base support member 112 and first clamping surface 122 to move in a generally downward direction toward second clamp surface 123. Sufficient downward movement of the upright base support member 112, thus, causes first clamp surface 122 to apply a downwardly (inwardly) directed force upon resilient material 150 and/or bed liner 148 such that the upright base support member 112 can be clampably secured to top rail 108 of the bed structure 104.

It should be appreciated that while the figures illustrate that the distance between first clamp surface 122 and lower portion 128 of the upper rail clamp member 118 is generally fixed (except for a limited amount of freedom allowed by interlocking tenon and mortise joint), the invention can be configured such that the distance therebetween is adjustable, primarily by exchange of the intermediate part 118.

Figure 7A:
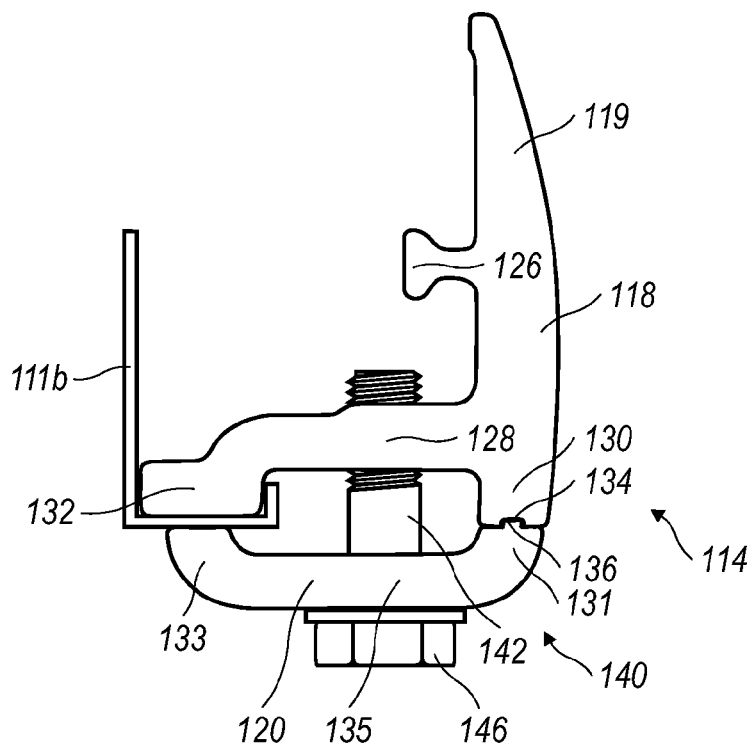
FIGS. 7A and 7B are partial cutaway views illustrating portions of a load carrier according to the present invention secured to different types of rails of vehicle bed internal bed rail systems; and, FIGS. 8A and 8B are partial cutaway views which also show some internal features and illustrate alternate embodiments of a load carrier configured according to the present invention.
Figure 7B:
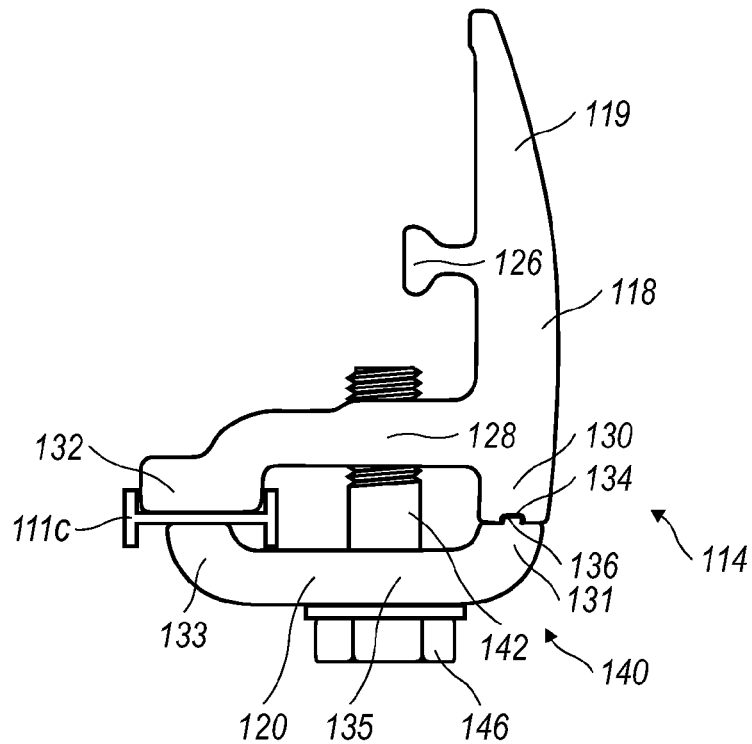
Figure 8A:
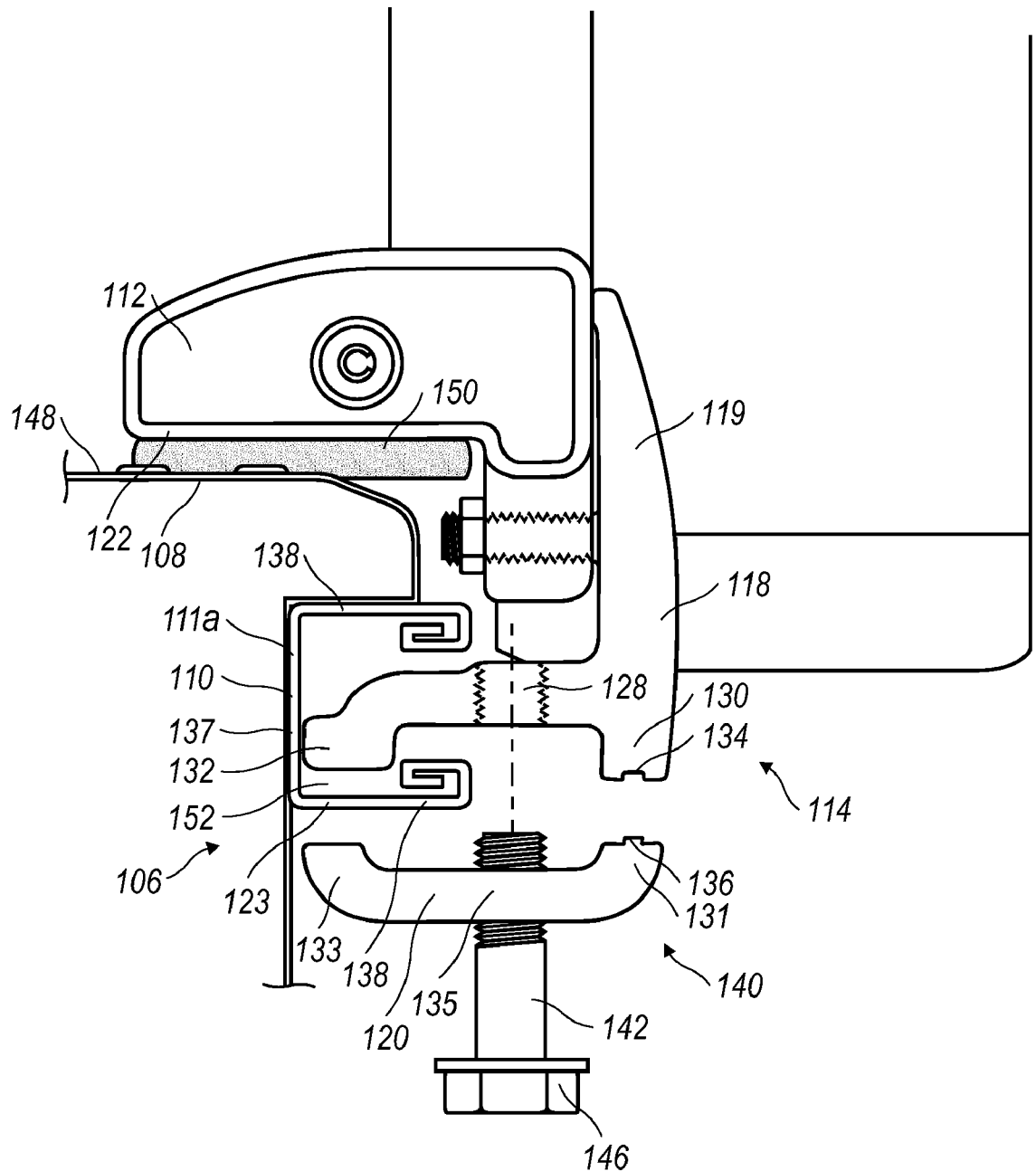
Figure 8B:
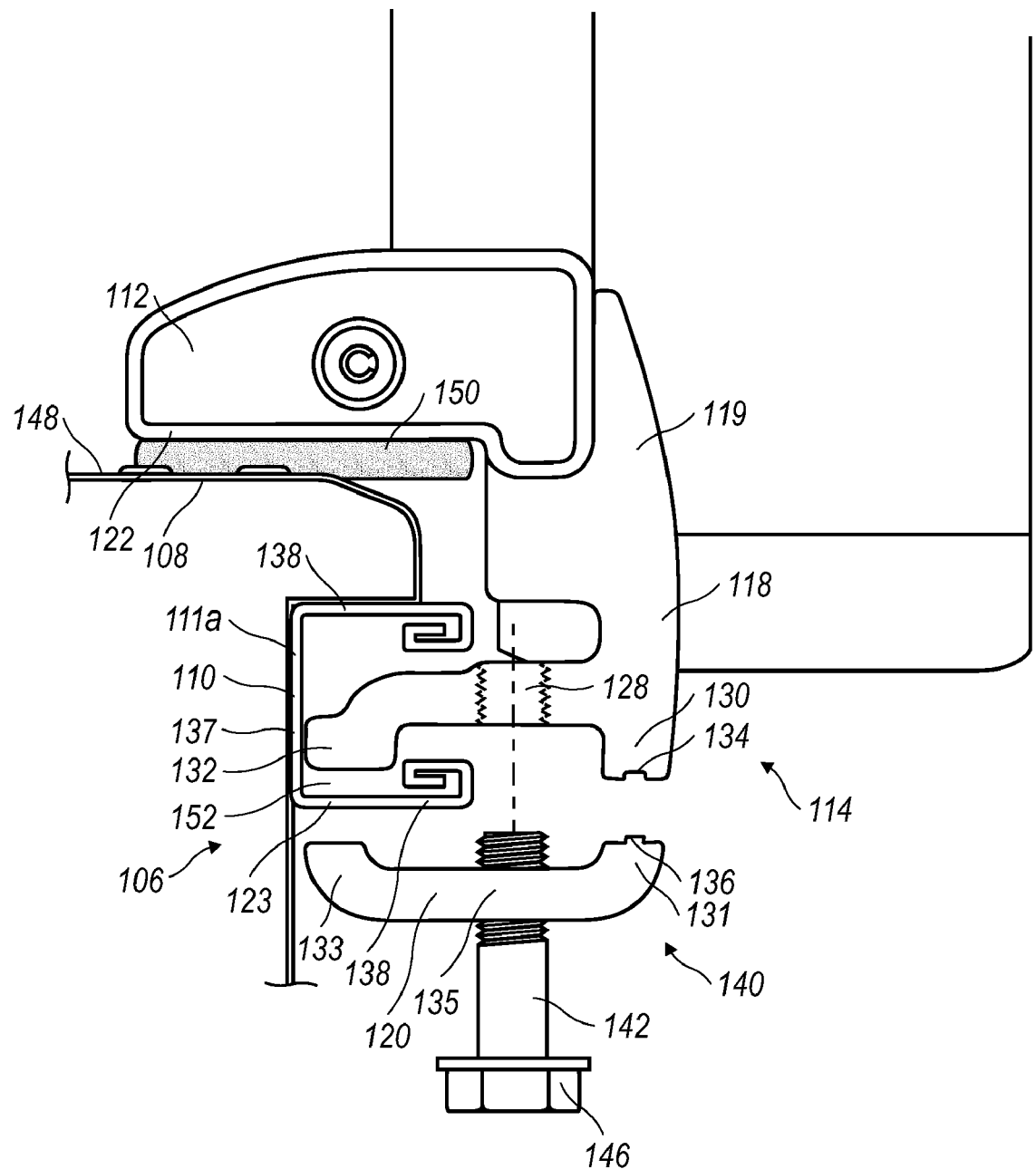

Referring now to FIGS. 7A and 7B, it should also be appreciated that while the present invention has been described as an assembly for securing a load carrier to a generally C-shaped rail 111a of an internal rail system wherein the rails have side walls 138 and base 137, which is secured to the sidewall of a bed of a vehicle, the present invention can be secured to rails 111b and 111c, which have generally L-shaped and I-shaped structures, respectively. Also, as illustrated in FIGS. 8A and 8B, while the present invention has been primarily described with upright base supporting member 112 and upper rail clamping member 118 secured to one another by means of a tenon and mortise joint, other means for detachably securing the structures to one another are contemplated, e.g., threaded fasteners; alternatively, the two structures may be fixed, e.g., integral with respect to one another.

The beneficial attributes that have been described hereinabove regarding the present invention's exploitation of the newly flexible nature of the pickup truck bed components upon which the mounting hardware of the load carrier is secured are primarily attributable to the manufacture of the top rail 108 and a rail system 110 from plastic and similarly flexible materials.

The invention's capability for efficiently providing an array of mounting arrangements for accommodating differently configured pickup trucks can be appreciated from the several different exemplary configurations disclosed for the interchangeable intermediate piece 118 of the mounting assembly 114.

While the present invention has been illustrated and described in what is deemed to be the preferred embodiments, it should be understood by those having ordinary skill in the art that various changes and modifications may be made to the invention without departing from the spirit and scope of the invention. Therefore, it should be appreciated by those skilled persons that the present invention is not to be limited to the particular embodiments disclosed herein, but the afforded protection is instead defined by the patent claims.

What is claimed is:

1. A load carrier arrangement comprising:
   a bed structure of a vehicle, said bed structure comprising a side wall having an upper surface and a rail of an internal bed rail system, said rail protruding in a substantially orthogonal direction from said side wall;
   an internal rail clamping assembly;
   a clamp adjustment assembly;
   an upright base support member supporting an upright post member for supporting a load and coupled with said internal rail clamping assembly; and
   said upright base support member comprising a first clamp surface clamped upon said upper surface of said side wall, said internal rail clamping assembly releasably secured to said rail of the internal bed rail system and said internal rail clamping assembly further comprising a second clamp surface asserting a clamping force upon a lower surface of said rail, said clamp adjustment assembly configured for positionally adjusting said first clamp surface with respect to said second clamp surface between clamped and unclamped positions.

2. The load carrier of claim 1 wherein said first and second clamp surfaces apply an inwardly directed clamping force.

3. The load carrier of claim 1 wherein said clamp adjustment assembly comprises a threaded fastener and threaded bore.

4. The load carrier of claim 1 wherein said rail clamping assembly is releasably connected to said upright base support member by a fastener.

5. The load carrier of claim 1 wherein said rail clamping assembly is integrally connected to said upright base support member.

6. The load carrier of claim 1 wherein a resilient structure is disposed between said upper surface of said side wall and said first clamping surface.

7. The load carrier of claim 6 wherein said resilient structure is a member selected from the group consisting of plastic, rubber and combinations thereof.

8. The load carrier of claim 7 wherein said resilient structure is a component of said vehicle.

9. The load carrier of claim 7 wherein said resilient structure is a component of said upright base support member.

10. The load carrier of claim 1 wherein said rail clamping assembly comprises an upper rail clamping member and a lower rail clamping member, said upper rail clamping member connected to said upright base support member, said lower rail clamping member connected to said upper rail clamping member.

11. The load carrier of claim 10 wherein said upper rail clamping member and said lower rail clamping member comprise a rotational arresting assembly for preventing rotational movement therebetween.

12. The load carrier of claim 11 wherein said rotational arresting assembly comprises an abutment member and a recess receiving said abutment member therein.

13. The load carrier of claim 10 wherein said upper rail clamping member and said lower rail clamping member are configured for releasably clampingly securing a portion of said rail therebetween.

14. The load carrier of claim 13 wherein said upper rail clamping member and said lower rail clamping member are configured for receiving a component of said clamp adjustment assembly.

15. The load carrier of claim 14 wherein said clamp adjustment assembly comprises a threaded fastener.

16. The load carrier of claim 1 wherein said rail clamping assembly is releasably connected to said upright base support member.

17. The load carrier of claim 16 wherein when said clamp adjustment assembly is adjustable such that when a clamping force is asserted upon said upper surface and said rail, a pulling force is applied upon a member of said releasable interlocking joint.

18. The load carrier of claim 16 wherein said rail clamping assembly and said upright base support member are configured for movement relative to one another such that said rail clamping member is adjustable along a length of said upright base support member.

19. The load carrier of claim 16 wherein said upright base support member and said rail clamping assembly comprise a releasable interlocking joint.

20. The load carrier of claim 19 wherein said releasable interlocking joint comprises a tenon and mortise.

21. The load carrier of claim 20 wherein said tenon is fan-shaped.

22. The load carrier of claim 1 wherein said rail clamping assembly comprises a foot member configured for substantial complementary fit with a portion of said rail.

23. The load carrier of claim 22 wherein said rail has a generally I-shaped cross-section.

24. The load carrier of claim 22 wherein said rail as a generally L-shaped cross section.

25. The load carrier of claim 22 wherein said rail clamping assembly is slidable along a length of said rail.

26. The load carrier of claim 22 wherein said rail has a generally C-shaped cross-section.

27. The load carrier of claim 26 wherein said rail comprises a pair of generally parallel side wall structures and a base wall structure, said base wall structure securable to an inner side wall of said bed structure.

28. The load carrier of claim 27 wherein said rail clamping assembly is releasably securable to one of said generally parallel side wall structures.

* * * * *